Patented Oct. 22, 1946

2,409,676

UNITED STATES PATENT OFFICE 2,409,676

PREPARATION OF INDOLE

William F. Gresham and Walter M. Bruner, Wilmington, Del., assignors to E. I. du Pont de Nemours & Company, Wilmington, Del., a corporation of Delaware No Drawing. Application September 20, 1944, Serial No. 555,046

9 Claims. (Cl. 260—319)

The present invention relates to the preparation of organic nitrogen compounds and is more specifically directed to a novel process for the preparation of indole by catalytic dehydrogenation of o-ethylaniline.

Heretofore, indole has been prepared by pyrogenic decomposition of various substances, particularly naturally-occurring nitrogenous materials, such as certain albumins. Indole has also been obtained as a constituent of the fraction of coal tar which has a boiling range of 240° to 260° C.

An object of this invention is to provide an improved method for the synthesis of indole. A further object is to prepare indole from alkyl aminobenzenes without the formation of excessive amounts of undesirable by-products.

These and other objects are accomplished in accordance with the invention by passing o-ethylaniline over a dehydrogenation catalyst under certain conditions to be described hereinafter in detail, whereby indole is obtained in 65% to 80% yield.

The dehydrogenation catalysts which may be employed in the synthesis of indole from o-ethylaniline according to this invention include the following elements and their oxides: aluminum of group III of the periodic system; titanium, zirconium, cerium and thorium in the left-hand column of group IV; vanadium, columbium and tantalum in the left-hand column of group V; chromium, molybdenum and tungsten in the left-hand column of group VI; and manganese, iron, nickel, and cobalt in the 4th series of groups VII and VIII. Mixtures of these elements or their oxides or mixed oxides, suitably in gel or hydrated form, may be employed, if desired. Also various catalyst supports and/or promoters, such as silica gel, kieselguhr, pumice and the like may be employed in conjunction with the aforesaid catalysts.

One of the preferred catalysts for the dehydrogenation of o-ethyl aniline to indole according to this invention is titania gel. A suitable method for preparing the titania gel catalyst is as follows: titanium chloride is cautiously added to water or to aqueous hydrochloric acid and the resulting solution of titanium compound is diluted with water to a comparatively large volume, and thereafter neutralized with aqueous ammonium hydroxide. The resulting gelatinous precipitate is removed by filtration and is washed many times with water to remove soluble impurities. Finally the gel is dried in an oven at 100° to 110° C. The catalyst thus obtained is crushed and screened (8 to 14 mesh), to produce particles of suitable uniform size.

The preparation of indole is generally conducted in accordance with the invention by passing o-ethylaniline over the dehydrogenation catalyst at a temperature within the range of about 550° to 750° C. (preferably 625° to 675° C.) and at a space velocity of about 50 to 1000. Space velocity is defined as the number of cc. of gas, N. T. P., which passes over 1 cc. of a catalyst per hour. After passage over the catalyst the reaction mixture is preferably cooled and condensed, and the resulting liquid is separated into its components either by steam distillation or by distillation at diminished pressure.

Any suitable reaction vessel may be employed, but it is preferable to use a tubular reactor made of or lined with inert materials, particularly a refractory such as pyrex glass, quartz, zircofrax, Vicor and the like.

Various substances have a beneficial effect when conducted over the dehydrogenation catalyst along with the o-ethylaniline. These substances include inert diluents, such as nitrogen, argon, water, stable hydrocarbons, hydrogen or other similar inert materials. These inert gases may be present in any convenient quantity but preferably about 5 to 20 volumes of inert gas is used per volume of gaseous o-ethylaniline. Good results are obtained when the volume ratio of inert gas to o-ethylaniline is about 10:1, as when the space velocity of the o-ethylaniline is about 100, and the space velocity of the inert gas is about 1000. If desired, the hydrogen which is liberated during the formation of indole may be caused to react with a hydrogen acceptor such as ethylene, or other unsaturated gaseous hydrocarbon, carbon dioxide, carbon monoxide, or a gas containing gaseous oxygen. Controlled amounts of air have a beneficial effect, since the oxygen of the air acts as a hydrogen acceptor, and also because the oxygen tends to limit the deposition of carbon on the catalyst or removes such carbon after it has been deposited.

The reaction is illustrated further by means of the following examples:

*Example 1.*—o-Ethylaniline (72 grams) was passed over a titania gel catalyst contained in a Vicor tube heated to a temperature of 698° to 705° C. (space velocity, 290). The effluent gas was cooled by means of a condenser, and the condensate was distilled at diminished pressure yielding 47.7 grams of recovered o-ethylaniline (B. P., 67°/4 mm.), and 14 grams of a distillation residue which was crude indole. Indole was separated from this residue by steam distillation.

*Example 2.*—A mixture of o-ethylaniline (75 grams) and carbon dioxide was passed over a titania gel catalyst in the apparatus employed in the preceding example at a temperature of 650° C. The space velocity of the o-ethylaniline was 106, and the space velocity of the carbon dioxide was 814. As the reaction progressed it was evident that carbon dioxide was acting as a hydrogen acceptor since small amounts of water were formed. Distillation of the reaction product gave a cut consisting chiefly of recovered o-ethylaniline (25.1 grams), and a fraction (28 grams) which had a boiling point of 72° C. at 1.5 mm. The latter was pure indole (M. P., 52° to 53° C.). This corresponds to a minimum yield, exclusive of intermediate fraction, of 58.1%, based on o-ethylaniline consumed, and a conversion of 38.7% based on o-ethylaniline processed.

*Example 3.*—A mixture of o-ethylaniline (71.1 grams) and nitrogen was passed over titania gel catalyst at a temperature of 645° to 659° C. Space velocity of the o-ethylaniline was 104, and space velocity of the nitrogen was 1075. The effluent gases were cooled by passage through a water-cooled condenser. Distillation of the resulting condensate gave 34.4 grams of o-ethylaniline (B. P. 40°/115 mm. to 55°/1 mm.), a small intermediate fraction, and a fraction containing pure indole (21.0 grams, B. P., 72°/1 mm.). This represents a yield of 73.9%, based on the o-ethylaniline consumed, and a conversion of 30.6% based on the o-ethylaniline processed.

*Example 4.*—A mixture of o-ethylaniline (72.9 grams) and air was passed over a titania gel catalyst at a temperature of 605 to 730° C. Space velocity of the o-ethylaniline was 108.5, and space velocity of the air was 1221. Distillation of the resulting product gave a small amount of water, a fraction containing recovered o-ethylaniline, and 12.4 grams of a fraction (B. P., 72°/1 mm.), which was practically pure indole.

The foregoing examples serve to illustrate the nature of the invention, but should not be considered as precisely limiting its scope. It will be recognized, for instance, that the conversion of o-ethylaniline is favored thermodynamically by the presence of relatively large amounts of diluent inert gas, but that high conversions under such conditions are attended, in practical operations, by appreciable mechanical loss of reactant and products, hence it is economical to operate at lower conversions than the maximum conversions attainable. It will also be recognized that small amounts of by-products such as o-vinylaniline, and indoline may be present in the effluent reaction mixture, and that these may be effectively recycled. Since many different embodiments of this invention may be employed without departing from the spirit and scope thereof it will be understood that we do not limit ourselves except as set forth in the following claims.

We claim:

1. In a process for the synthesis of indole the steps which comprise heating o-ethylaniline in the presence of a solid dehydrogenation catalyst at a temperature within the range of about 550° to 750° C., and condensing from the resultant gaseous mixture the reaction product containing indole and unreacted o-ethylaniline.

2. In a process for the synthesis of indole the steps which comprise heating a mixture of o-ethylaniline and gas which remains inert under the reaction conditions, said mixture containing about 5 to 20 volumes of inert gas per volume of o-ethylaniline, in the presence of a solid dehydrogenation catalyst at a temperature within the range of 550° to 750° C., and condensing from the resultant gaseous mixture the reaction product containing indole and unreacted o-ethylaniline.

3. A process for the synthesis of indole which comprises heating o-ethylaniline with a gaseous hydrogen acceptor in the presence of a solid dehydrogenation catalyst at a temperature within the range of 550° to 750° C., condensing from the resultant gaseous mixture the reaction product containing indole and unreacted o-ethylaniline, and recovering indole from the said product by distillation.

4. A process for the synthesis of indole which comprises heating o-ethylaniline in the presence of a titania gel catalyst at a temperature within the range of 550° to 750° C., condensing from the resultant gaseous mixture the reaction product containing indole and unreacted o-ethylaniline, and recovering indole from the said product by distillation.

5. A process for the synthesis of indole which comprises contacting o-ethylaniline with a titania gel catalyst at a space velocity within the range of about 50 to 1000 at a temperature within the range of about 625° to 675° C., condensing from the resultant gaseous mixture the reaction product containing indole and unreacted o-ethylaniline, and recovering indole from the said product by distillation.

6. The process set forth in claim 3 in which the said hydrogen acceptor is a gas containing gaseous oxygen.

7. The process set forth in claim 3 in which the said hydrogen acceptor is carbon dioxide.

8. The process set forth in claim 3 in which the hydrogen acceptor is an unsaturated gaseous hydrocarbon.

9. A process for the preparation of indole which comprises passing a mixture of nitrogen and o-ethylaniline over a titania gel catalyst at a temperature of about 645° to 659° C., the space velocities of the o-ethylaniline and nitrogen being about 100 and 1000 respectively, cooling the effluent gases whereby a condensate indole is obtained, and separating indole from the said condensate by distillation.

WILLIAM F. GRESHAM.
WALTER M. BRUNER.